(12) United States Patent
Liu et al.

(10) Patent No.: US 12,292,551 B2
(45) Date of Patent: May 6, 2025

(54) COMPACT OPTICAL IMAGING DEVICE WITH SHORTENED FOCAL LENGTH, IMAGING MODULE, AND ELECTRONIC DEVICE

(71) Applicant: HON HAI PRECISION INDUSTRY CO., LTD., New Taipei (TW)

(72) Inventors: Hsing-Chen Liu, New Taipei (TW); Gwo-Yan Huang, New Taipei (TW); Chia-Chih Yu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 578 days.

(21) Appl. No.: 17/676,367

(22) Filed: Feb. 21, 2022

(65) Prior Publication Data

US 2022/0272240 A1 Aug. 25, 2022

(30) Foreign Application Priority Data

Feb. 22, 2021 (CN) .......................... 202110199773.7

(51) Int. Cl.
*G02B 9/60* (2006.01)
*G02B 3/04* (2006.01)
*G02B 13/00* (2006.01)

(52) U.S. Cl.
CPC .......... *G02B 13/0045* (2013.01); *G02B 3/04* (2013.01); *G02B 9/60* (2013.01)

(58) Field of Classification Search
CPC ... G02B 3/04; G02B 9/60; G02B 9/62; G02B 9/64
See application file for complete search history.

(56) References Cited

U.S. PATENT DOCUMENTS

| 2020/0096736 | A1* | 3/2020 | Chang | G02B 13/0035 |
| 2020/0271916 | A1* | 8/2020 | Baba | G02B 13/18 |
| 2021/0026108 | A1* | 1/2021 | Chiang | G02B 13/0045 |
| 2021/0389569 | A1* | 12/2021 | Lee | G02B 13/0045 |

* cited by examiner

*Primary Examiner* — Sharrief I Broome
*Assistant Examiner* — Journey F Sumlar
(74) *Attorney, Agent, or Firm* — ScienBiziP, P.C.

(57) ABSTRACT

A compact optical imaging device with shortened focal length, for use in an imaging module and an electronic device, comprises first to fifth lenses. An image-side surface of the first lens is concave near an optical axis. An image-side surface of the third lens is concave near the optical axis. The second and fourth lenses have a negative refractive power. The third and fifth lenses have a positive refractive power. The optical imaging device satisfies formulas: $95°/\text{mm} < \text{FOV}/\text{TL5} < 105°/\text{mm}$ and $1\ \text{mm}^{-1} < \text{FNO}/\text{TL4} < 1.5\ \text{mm}^{-1}$, FOV being a maximum field of view of the optical imaging device, TL5 being a distance from an object-side surface of the fifth lens to an image plane of the optical imaging device along the optical axis, FNO being a F-number of the optical imaging device, and TL4 being a distance from an object-side surface of the fourth lens to the image plane along the optical axis.

17 Claims, 10 Drawing Sheets

COMPACT OPTICAL IMAGING DEVICE WITH SHORTENED FOCAL LENGTH, IMAGING MODULE, AND ELECTRONIC DEVICE

FIELD

The subject matter relates to imaging, and more particularly, to an optical imaging device, an imaging module having the optical imaging device, and an electronic device having the imaging module.

BACKGROUND

In recent years, the demand for compact imaging lenses has grown. Generic light sensors of imaging lenses mainly include CCD (Charge Coupled Device) and CMOS (Complementary Metal-Oxide Semiconductor Sensor). Furthermore, as advances in semiconductor manufacturing technology have allowed the pixel size of sensors to be reduced, the resolution of compact imaging lens elements has gradually increased, and there is an increasing demand for compact imaging lens elements featuring better imaging quality.

As the popularity of sophisticated portable electronic products such as smart phone or PDA (personal digital assistant) has increased, the conventional compact optical imaging device for portable electronic products, such as having four lens elements, cannot meet the demand for higher-order optical imaging devices with better imaging quality using more pixels. At present, a compact optical imaging device uses five lens elements therein to improve the imaging quality and the resolution of the optical imaging device. However, such optical imaging device has a long focal length, which is problematic for installation in a compact camera device.

BRIEF DESCRIPTION OF THE DRAWINGS

Implementations of the present technology will now be described, by way of example only, with reference to the attached figures.

DETAILED DESCRIPTION

Figure 1:
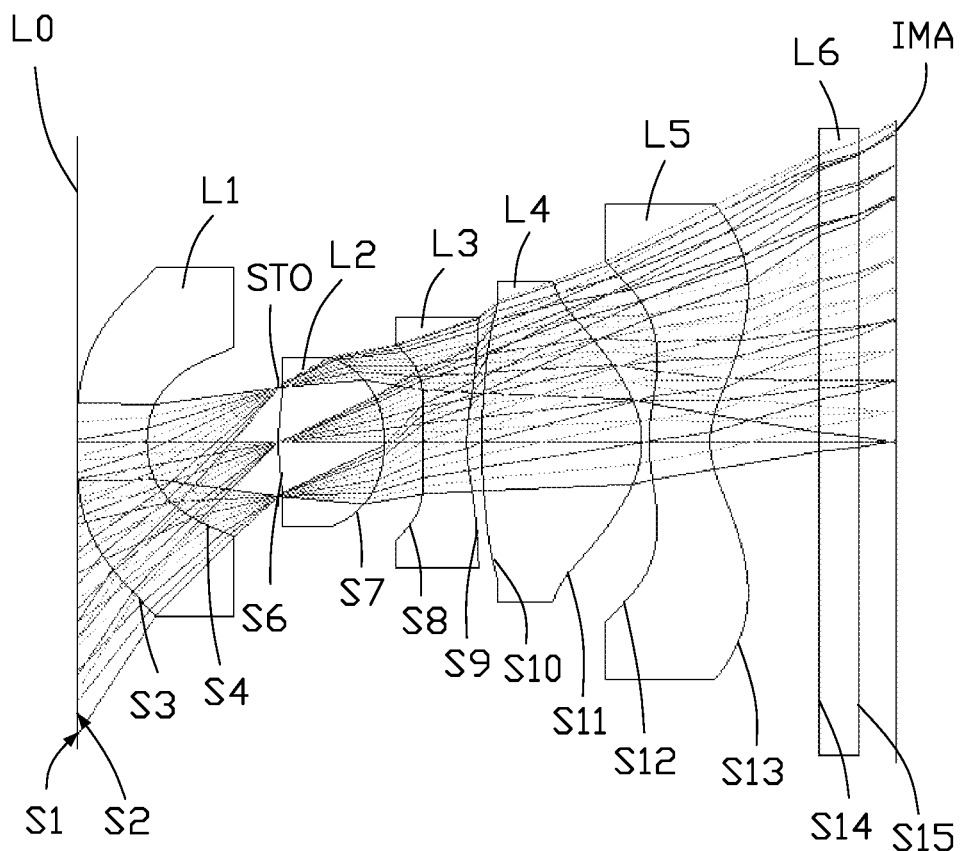
FIG. 1 is a diagrammatic view of a first embodiment of an optical imaging device according to the present disclosure.

It will be appreciated that for simplicity and clarity of illustration, where appropriate, reference numerals have been repeated among the different figures to indicate corresponding or analogous components. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Referring to FIG. 1, a first embodiment of an optical imaging device 10 is provided. The optical imaging device 10 includes, from an object side to an image side, a first lens L1 having a refractive power, a second lens L2 having a positive refractive power, a third lens L3 having a negative refractive power, a fourth lens L4 having a positive refractive power, and a fifth lens L5 having a positive refractive power.

The first lens L1 includes an object-side surface S3 and an image-side surface S4. The second lens L2 includes an object-side surface S6 and an image-side surface S7. The third lens L3 includes an object-side surface S8 and an image-side surface S9. The fourth lens L4 includes an object-side surface S10 and an image-side surface S11. The fifth lens L5 includes an object-side surface S12 and an image-side surface S13. For reference purposes, an imaginary plane L0 of zero thickness is defined. The imaginary plane L0 includes an object-side surface S1 and an image-side surface S2.

The image-side surface S2 of the imaginary plane L0 is in contact with (tangentially) the object-side surface S3 of the first lens L1. The image-side surface S4 of the first lens L1 is concave near an optical axis of the optical imaging device 10. The image-side surface S9 of the third lens L3 is concave near the optical axis. The object-side surface S10 of the fourth lens L4 is concave near the optical axis, and the image-side surface S11 of the fourth lens L4 is convex near the optical axis. The image-side surface S13 of the fifth lens L5 is convex near an edge of the fifth lens L5. At least one of the object-side surface S12 and the image-side surface S13 of the fifth lens L5 is aspherical.

In one embodiment, the optical imaging device 10 satisfies the following formulas (1):

$$95°/mm < FOV/TL5 < 105°/mm \text{ and } 1 \text{ mm}^{-1} < FNO/TL4 < 1.5 \text{ mm}^{-1} \quad \text{(formulas (1))}$$

FOV is a maximum field of view of the optical imaging device 10, TL5 is a distance from the object-side surface S12 of the fifth lens L5 to an image plane IMA of the optical imaging device 10 along the optical axis, FNO is a F-number of the optical imaging device 10, and TL4 is a distance from the object-side surface S10 of the fourth lens L4 to the image plane IMA of the optical imaging device 10 along the optical axis. As such, refraction angles of incident light are slowly and gradually changed as incident light enters the optical imaging device 10, radical or dramatic changes in refraction angles of the optical imaging device 10 are avoided, stray light is reduced, so that the imaging quality can be improved. Furthermore, the optical imaging device 10 can have a long focal length, which can capture images at long range. Furthermore, the optical imaging device 10 can have a large field of view, which can capture images at close range.

In some embodiments, the optical imaging device 10 satisfies the following formula (2):

$$1.5 < Imgh/f < 2.0. \quad \text{(formula (2))}$$

Imgh is one half of an image height corresponding to the maximum field of view of the optical imaging device 10, and f is an effective focal length of the optical imaging device 10. As such, a telephoto capability is improved.

In some embodiments, the optical imaging device 10 satisfies the following formula (3):

$$0.75 < (V2 + V3 + V5)/(V1 + V4) < 1. \quad \text{(formula (3))}$$

V1 is a dispersion coefficient of the first lens L1, V2 is a dispersion coefficient of the second lens L2, V3 is a dispersion coefficient of the third lens L3, V4 is a dispersion coefficient of the fourth lens L4, and V5 is a dispersion coefficient of the fifth lens L5. As such, the balance between chromatic aberration correction and astigmatism correction is achieved.

In some embodiments, the optical imaging device 10 satisfies the following formula (4):

$$3 < TL1/f < 3.5. \quad \text{(formula (4))}$$

TL1 is a distance from the object-side surface S3 of the first lens L1 to the image plane IMA of the optical imaging device 10 along the optical axis, and f is the effective focal length of the optical imaging device 10. As such, a total length of the optical imaging device 10 is reduced, and the optical imaging device 10 can have improved telephoto capabilities.

In some embodiments, the optical imaging device 10 satisfies the following formula (5):

$$f/EPD < 2.5. \quad \text{(formula (5))}$$

f is the effective focal length of the optical imaging device 10, EPD is an entrance pupil diameter of the optical imaging device 10. As such, light admitted to the optical imaging device 10 and the F-number of the optical imaging device 10 can be easily controlled, so that the optical imaging device 10 has an excellent power of resolution for nearby objects, the imaging quality of the optical imaging device 10 is improved.

In some embodiments, the optical imaging device 10 satisfies the following formula (6):

$$2.4 < V4/V5 < 3.0. \quad \text{(formula (6))}$$

V4 is the dispersion coefficient of the fourth lens L4 and V5 is the dispersion coefficient of the fifth lens L5. As such, chromatic aberration is corrected.

In some embodiments, the optical imaging device 10 also includes a stop STO disposed on a surface of any one of the lenses L1 to L5. The stop STO can also be disposed before the first lens L1. The stop STO can also be sandwiched between any two lenses. The stop STO can also be disposed on the image-side surface S9 of the third lens L3. For example, as shown in FIG. 1, the stop STO is disposed on the object-side surface S6 of the second lens L2. The stop can be a glare stop or a field stop, and reduce starred or starry light and improve the imaging quality.

In some embodiments, the optical imaging device 10 also includes an infrared filter L6. The infrared filter L6 includes an object-side surface S14 and an image-side surface S15. The infrared filter L6 is arranged on the image-side surface S13 of the fifth lens L5. The infrared filter L6 can filter out visible rays and only allow infrared rays to pass through, so that the optical imaging device 10 can also be used in a dark environment.

In the optical imaging device 10, by the arrangement of different lenses in a compact space and the arrangement of the refractive power of each lens in adjacency, the optical imaging device 10 has a small size, which can be applied in an electronic device of a small size. Furthermore, when the above formulas are met, refraction angles of incident light are slowly and gradually changed as incident light enters the optical imaging device 10. Furthermore, the optical imaging device 10 can have a long focal length, which can capture images at long range. Furthermore, the optical imaging device 10 can have a large field of view, which can capture images at close range.

First Embodiment

Referring to FIG. 1, the optical imaging device 10 includes, from the object side to the image side, a first lens L1 with a refractive power, a stop STO, a second lens L2 with a positive refractive power, a third lens L3 with a negative refractive power, a fourth lens L4 with a positive refractive power, a fifth lens L5 with a positive refractive power, and an infrared filter L6.

The object-side surface S3 of the first lens L1 is convex near the optical axis, and the image-side surface S4 of the first lens L1 is concave near the optical axis. The object-side surface S6 of the second lens L2 is convex near the optical axis, and the image-side surface S7 of the second lens L2 is convex near the optical axis. The object-side surface S8 of the third lens L3 is concave near the optical axis, and the image-side surface S9 of the third lens L3 is concave near the optical axis. The object-side surface S10 of the fourth lens L4 is concave near the optical axis, and the image-side surface S11 of the fourth lens L4 is convex near the optical axis. The object-side surface S12 of the fifth lens L5 is convex near the optical axis, and the image-side surface S13 of the fifth lens L5 is concave near the optical axis.

When the optical imaging device 10 is used, rays from the object side enter the optical imaging device 10, successively pass through the first lens L1, the stop STO, the second lens L2, the third lens L3, the fourth lens L4, the fifth lens L5, and the infrared filter L6, and finally converge on the image plane IMA.

Table 1 shows characteristics of the optical imaging device 10. A reference wavelength of focal length, refractive index, and Abbe number is 558 nm, and the units of radius of curvature, thickness, and semi-diameter are in millimeters (mm).

$$Z = \frac{cr^2}{1 + \sqrt{1 - (k+1)c^2 r^2}} + Ar^4 + Br^6 + Cr^8 + Dr^{10} + Er^{12} + Fr^{14} + Gr^{16} + \ldots$$

TABLE 1

First embodiment
f = 1.276 mm, FNO = 2.399, FOV = 128.78°

| Surface | Lens | Type of surface | radius of curvature | thickness | material | refractive index | Abbe number | semi-diameter |
|---|---|---|---|---|---|---|---|---|
| object side surface | | standard surface | infinite | 10000000000 | | | | 0.000 |
| S1 | | standard surface | infinite | 0.000 | | | | 2.048 |
| S2 | | standard surface | infinite | 0.000 | | | | 2.048 |
| S3 | first lens | aspheric surface | 0.110 | 0.372 | glass | 1.53 | 55 | 1.171 |
| S4 | | aspheric surface | 1.151 | 0.698 | | | | 0.636 |
| S5 | | standard surface | 0.000 | −0.001 | | | | 0.364 |
| S6 | second lens | aspheric surface | 0.465 | 0.561 | glass | 1.53 | 55 | 0.394 |
| S7 | | aspheric surface | −0.887 | 0.204 | | | | 0.569 |
| S8 | third lens | aspheric surface | 0.301 | 0.232 | glass | 1.66 | 20 | 0.656 |
| S9 | | aspheric surface | 0.725 | 0.078 | | | | 0.939 |
| S10 | fourth lens | aspheric surface | −0.250 | 0.850 | glass | 1.53 | 55 | 0.944 |
| S11 | | aspheric surface | −1.249 | 0.039 | | | | 1.075 |
| S12 | fifth lens | aspheric surface | 0.670 | 0.323 | glass | 1.66 | 20 | 1.208 |
| S13 | | aspheric surface | 1.421 | 0.576 | | | | 1.595 |
| S14 | infrared filter | standard surface | infinite | 0.210 | glass | 1.52 | 64 | 2.100 |
| S15 | | standard surface | infinite | 0.200 | | | | 2.100 |
| IMA | | standard surface | infinite | 0.000 | | | | 2.150 | f is the effective focal length of the optical imaging device 10, FNO is the F-number of the optical imaging device 10, and FOV is the maximum field of view of the optical imaging device 10.

Z represents a height of a surface parallel to a Z axis, r represents a radial distance starting from a vertex of the surface, c represents curvature at the vertex, K represents a conic constant, and K4, K6, K8, K10, K12, K14, K16, K18,

TABLE 2

First embodiment

| surface | K | K4 | K6 | K8 | K10 |
|---|---|---|---|---|---|
| S3 | 0.000E+00 | 6.240E−01 | −1.074E+00 | 1.494E+00 | −1.262E+00 |
| S4 | 0.000E+00 | 6.240E−01 | −1.074E+00 | 1.494E+00 | −1.262E+00 |
| S6 | 0.000E+00 | −7.830E−01 | −3.849E+00 | 5.311E+01 | −3.689E+02 |
| S7 | 0.000E+00 | −7.830E−01 | −3.849E+00 | 5.311E+01 | −3.689E+02 |
| S8 | 0.000E+00 | 0.000E+00 | 0.000E+00 | 0.000E+00 | 0.000E+00 |
| S9 | 0.000E+00 | 0.000E+00 | 0.000E+00 | 0.000E+00 | 0.000E+00 |
| S10 | 0.000E+00 | −1.110E−01 | −4.130E−01 | 3.236E+00 | −9.054E+00 |
| S11 | 0.000E+00 | 1.990E−01 | −4.780E−01 | 2.587E+00 | −6.764E+00 |
| S12 | 0.000E+00 | −8.200E−01 | 3.900E−02 | 2.642E+00 | −5.899E+00 |
| S13 | 0.000E+00 | −1.356E+00 | 1.888E+00 | −1.799E+00 | 1.041E+00 |

| surface | K12 | K14 | K16 | K18 | K20 |
|---|---|---|---|---|---|
| S3 | 5.580E−01 | −1.102E+00 | 0.000E+00 | 0.000E+00 | 0.000E+00 |
| S4 | 5.580E−01 | −1.102E+00 | 0.000E+00 | 0.000E+00 | 0.000E+00 |
| S6 | 1.278E+03 | −2.246E+03 | 1.694E+03 | −8.349E+02 | 0.000E+00 |
| S7 | 1.278E+03 | −2.246E+03 | 1.694E+03 | −8.349E+02 | 0.000E+00 |
| S8 | 0.000E+00 | 0.000E+00 | 0.000E+00 | 0.000E+00 | 0.000E+00 |
| S9 | 0.000E+00 | 0.000E+00 | 0.000E+00 | 0.000E+00 | 0.000E+00 |
| S10 | 1.446E+01 | −1.365E+01 | 7.125E+00 | −1.626E+00 | 0.000E+00 |
| S11 | 1.039E+01 | −1.195E+01 | 1.092E+01 | −6.194E+00 | 1.464E+00 |
| S12 | 6.127E+00 | −3.494E+00 | 1.093E+00 | −1.530E−01 | 0.000E+00 |
| S13 | −2.950E−01 | −1.900E−02 | 4.200E−02 | −1.200E−02 | 1.180E−03 |

It should be noted that an object surface and an image surface of each lens of the optical imaging device 10 may be aspherical. The aspherical equation of each aspherical surface as follows:

and K20 represent aspherical coefficients of fourth-order, sixth-order, eighth-order, tenth-order, twelfth-order, fourteenth-order, sixteenth-order, eighteenth-order, and twentieth-order, respectively. In this embodiment, the object surface and the image surface of the first to fifth lenses L1-L5 of the optical imaging device 10 are aspherical, the conic constant and the aspherical coefficient of each aspherical surface are shown in Table 2.

Figure 2:
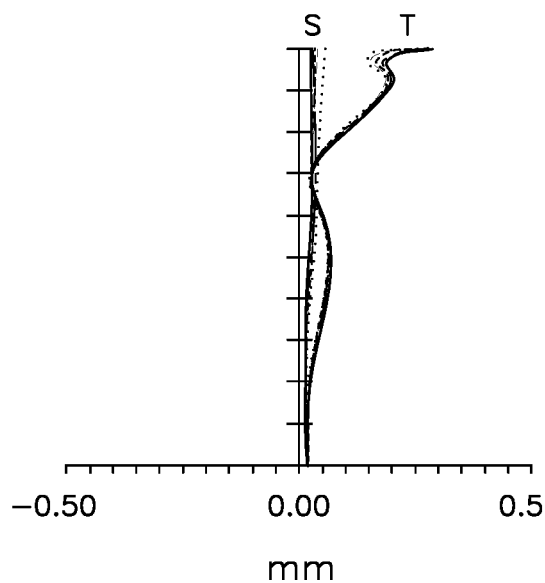
FIG. 2 is a diagram of field curvatures and distortions of the optical imaging device in the first embodiment.
Figure 2:
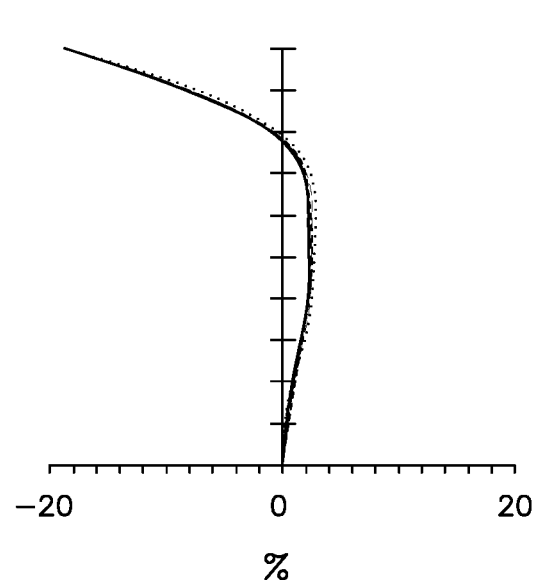

FIG. 2 shows field curvature curves and distortion curves of the optical imaging device 10 of the first embodiment, the reference wavelength of field curvature curves and distortion curves is 455 nm. The field curvature curves represent the meridian field curvature and the sagittal field curvature, in which the maximum value of each of the sagittal field curve and the meridional field curve is less than 0.3 mm, indicating that good compensation is obtained. The distortion curves represent distortion values corresponding to different field angles, in which the maximum distortion is less than 20%, indicating that distortion has been corrected.

Second Embodiment

Figure 3:
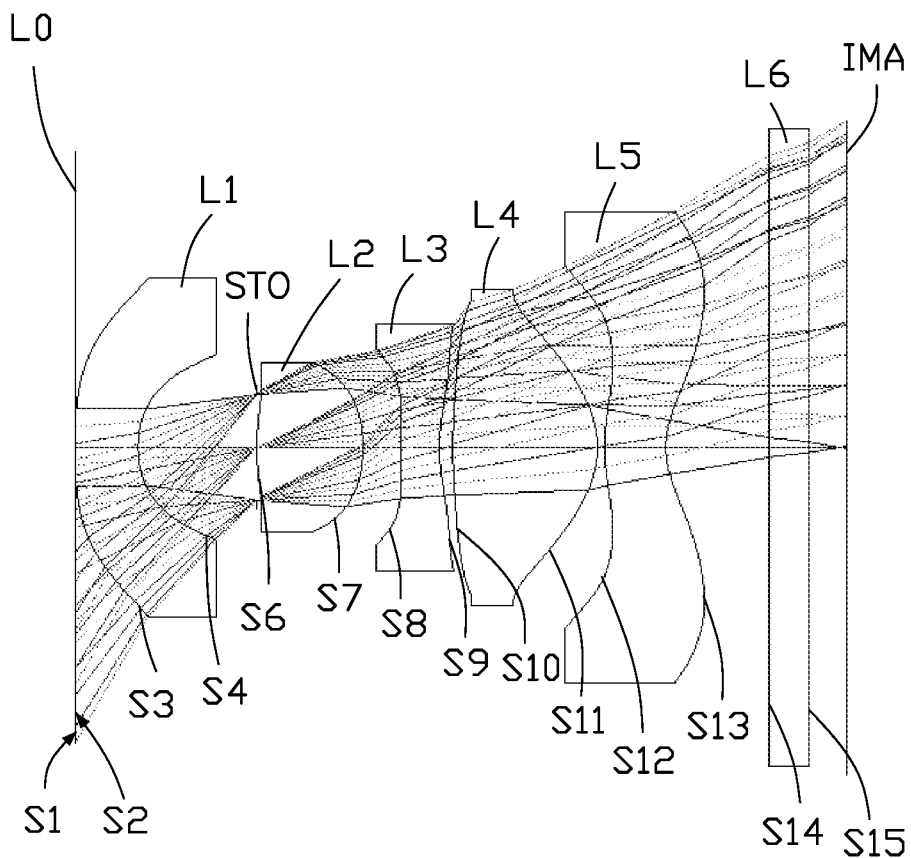
FIG. 3 is a diagrammatic view of a second embodiment of an optical imaging device according to the present disclosure.

Referring to FIG. 3, the optical imaging device 10 includes, from the object side to the image side, a first lens L1 with a refractive power, a stop STO, a second lens L2 with a positive refractive power, a third lens L3 with a negative refractive power, a fourth lens L4 with a positive refractive power, a fifth lens L5 with a positive refractive power, and an infrared filter L6.

The object-side surface S3 of the first lens L1 is convex near the optical axis, and the image-side surface S4 of the first lens L1 is concave near the optical axis. The object-side surface S6 of the second lens L2 is convex near the optical axis, and the image-side surface S7 of the second lens L2 is convex near the optical axis. The object-side surface S8 of the third lens L3 is concave near the optical axis, and the image-side surface S9 of the third lens L3 is concave near the optical axis. The object-side surface S10 of the fourth lens L4 is concave near the optical axis, and the image-side surface S11 of the fourth lens L4 is convex near the optical axis. The object-side surface S12 of the fifth lens L5 is convex near the optical axis, and the image-side surface S13 of the fifth lens L5 is concave near the optical axis.

When the optical imaging device 10 is used, rays from the object side enter the optical imaging device 10, successively pass through the first lens L1, the stop STO, the second lens L2, the third lens L3, the fourth lens L4, the fifth lens L5, and the infrared filter L6, and finally converge on the image plane IMA.

Table 3 shows characteristics of the optical imaging device 10. A reference wavelength of focal length, refractive index, and Abbe number is 558 nm, and the units of radius of curvature, thickness, and semi-diameter are in millimeters (mm).

TABLE 3

Second embodiment
f = 1.272 mm, FNO = 2.373, FOV = 130.126°

| Surface | Lens | Type of surface | radius of curvature | thickness | material | refractive index | Abbe number | semi-diameter |
|---|---|---|---|---|---|---|---|---|
| object side surface | | standard surface | infinite | 10000000000 | | | | 0.000 |
| S1 | | standard surface | infinite | 0.000 | | | | 1.945 |
| S2 | | standard surface | infinite | 0.000 | | | | 1.945 |
| S3 | first lens | aspheric surface | 0.127 | 0.333 | glass | 1.53 | 113 | 1.111 |
| S4 | | aspheric surface | 1.144 | 0.628 | | | | 0.611 |
| S5 | | standard surface | 0.000 | 0.001 | | | | 0.347 |
| S6 | second lens | aspheric surface | 0.481 | 0.561 | glass | 1.54 | 86 | 0.381 |
| S7 | | aspheric surface | 0.877 | 0.196 | | | | 0.559 |
| S8 | third lens | aspheric surface | 0.310 | 0.207 | glass | 1.66 | 30 | 0.638 |
| S9 | | aspheric surface | 0.729 | 0.071 | | | | 0.813 |
| S10 | fourth lens | aspheric surface | −0.226 | 0.764 | glass | 1.54 | 81 | 0.961 |
| S11 | | aspheric surface | −1.279 | 0.037 | | | | 1.040 |
| S12 | fifth lens | aspheric surface | 0.677 | 0.324 | glass | 1.65 | 31 | 1.190 |
| S13 | | aspheric surface | 1.435 | 0.547 | | | | 1.546 |
| S14 | infrared filter | standard surface | infinite | 0.210 | glass | 1.52 | 64 | 2.100 |
| S15 | | standard surface | infinite | 0.200 | | | | 2.100 |
| IMA | | standard surface | infinite | 0.000 | | | | 2.150 | f is the effective focal length of the optical imaging device 10, FNO is the F-number of the optical imaging device 10, and FOV is the maximum field of view of the optical imaging device 10.

TABLE 4

Second embodiment

| surface | K | K4 | K6 | K8 | K10 |
|---|---|---|---|---|---|
| S3 | 0.000E+00 | 6.287E−01 | −1.073E+00 | 1.493E+00 | −1.263E+00 |
| S4 | 0.000E+00 | 6.287E−01 | −1.073E+00 | 1.493E+00 | −1.263E+00 |
| S6 | 0.000E+00 | −7.907E−01 | −3.892E+00 | 5.297E+01 | −3.691E+02 |
| S7 | 0.000E+00 | −7.907E−01 | −3.892E+00 | 5.297E+01 | −3.691E+02 |
| S8 | 0.000E+00 | −1.060E+00 | 9.031E−01 | 3.831E+00 | −1.656E+01 |
| S9 | 0.000E+00 | −1.060E+00 | 9.031E−01 | 3.831E+00 | −1.656E+01 |
| S10 | 0.000E+00 | −1.134E−01 | −4.165E−01 | 3.233E+00 | −9.055E+00 |
| S11 | 0.000E+00 | 1.999E−01 | −4.757E−01 | 2.590E+00 | −6.760E+00 |
| S12 | 0.000E+00 | −8.218E−01 | 3.911E−02 | 2.642E+00 | −5.900E+00 |
| S13 | 0.000E+00 | −1.360E+00 | 1.888E+00 | −1.799E+00 | 1.041E+00 |

TABLE 4-continued

Second embodiment

| surface | K12 | K14 | K16 | K18 | K20 |
|---|---|---|---|---|---|
| S3 | 5.568E−01 | −1.026E−01 | 0.000E+00 | 0.000E+00 | 0.000E+00 |
| S4 | 5.568E−01 | −1.026E−01 | 0.000E+00 | 0.000E+00 | 0.000E+00 |
| S6 | 1.278E+03 | −2.246E+03 | 1.690E+03 | −9.184E+02 | 0.000E+00 |
| S7 | 1.278E+03 | −2.246E+03 | 1.690E+03 | −9.184E+02 | 0.000E+00 |
| S8 | 3.059E+01 | −3.096E+01 | 1.725E+01 | −4.332E+00 | 0.000E+00 |
| S9 | 3.059E+01 | −3.096E+01 | 1.725E+01 | −4.332E+00 | 0.000E+00 |
| S10 | 1.445E+01 | −1.365E+01 | 7.144E+00 | −1.602E+00 | 0.000E+00 |
| S11 | 1.040E+01 | −1.195E+01 | 1.092E+01 | −6.193E+00 | 1.464E+00 |
| S12 | 6.127E+00 | −3.494E+00 | 1.093E+00 | −1.523E−01 | 1.475E−04 |
| S13 | −2.947E−01 | −1.935E−02 | 4.234E−02 | −1.211E−02 | 1.180E−03 |

Figure 4:
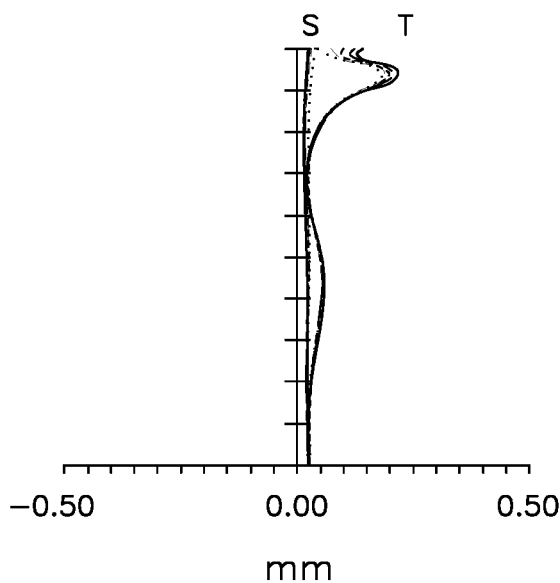
FIG. 4 is a diagram of field curvatures and distortions of the optical imaging device in the second embodiment.
Figure 4:
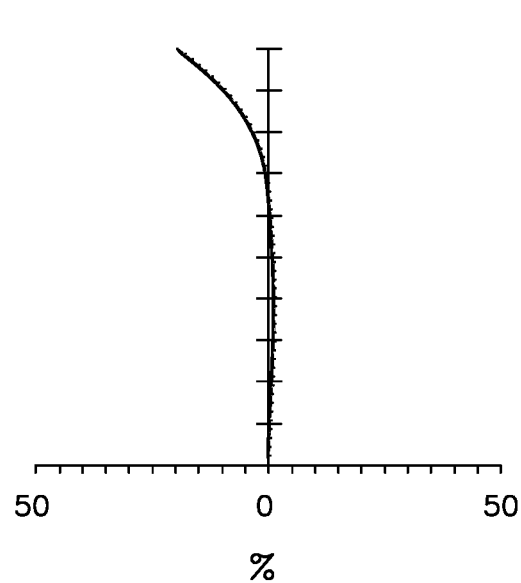

FIG. 4 shows field curvature curves and distortion curves of the optical imaging device 10 of the second embodiment, the reference wavelength of field curvature curves and distortion curves is 455 nm. The field curvature curves represent the meridian field curvature and the sagittal field curvature, in which the maximum value of each of the sagittal field curve and the meridional field curve is less than 0.3 mm, indicating that good compensation is obtained. The distortion curves represent distortion values corresponding to different field angles, in which the maximum distortion is less than 20%, indicating that distortion has been corrected.

Third Embodiment

Figure 5:
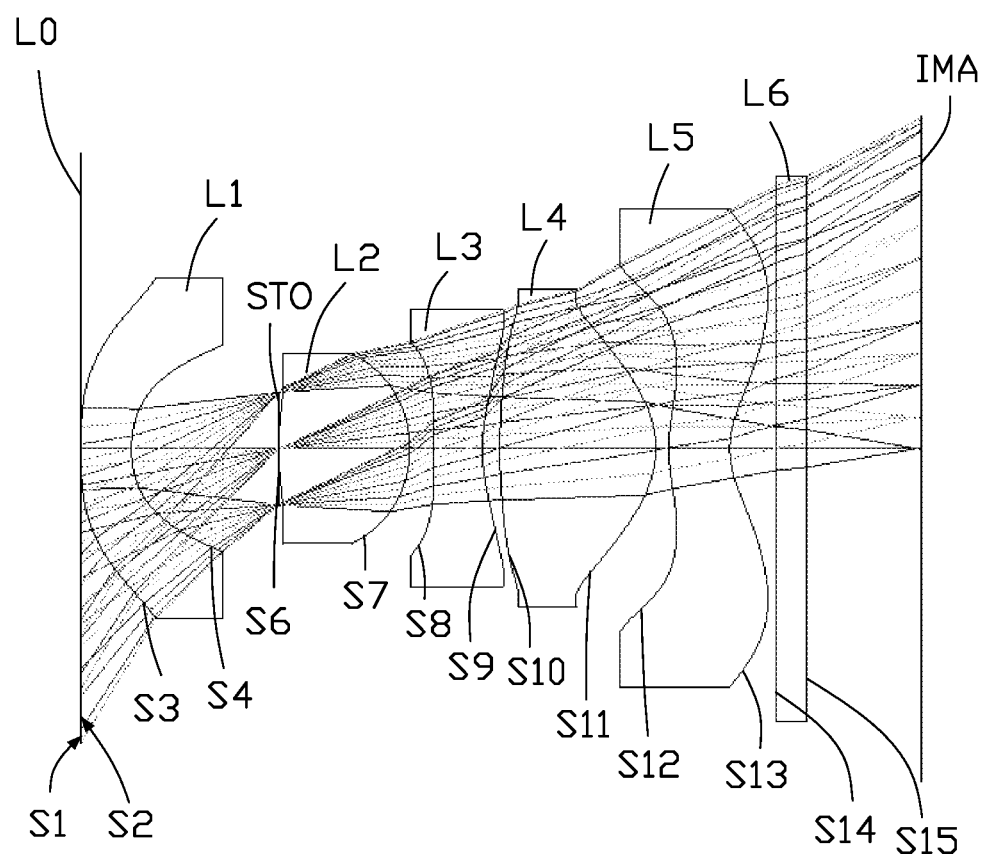
FIG. 5 is a diagrammatic view of a third embodiment of an optical imaging device according to the present disclosure.

Referring to FIG. 5, the optical imaging device 10 includes, from the object side to the image side, a first lens L1 with a refractive power, a stop STO, a second lens L2 with a positive refractive power, a third lens L3 with a negative refractive power, a fourth lens L4 with a positive refractive power, a fifth lens L5 with a positive refractive power, and an infrared filter L6.

The object-side surface S3 of the first lens L1 is convex near the optical axis, and the image-side surface S4 of the first lens L1 is concave near the optical axis. The object-side surface S6 of the second lens L2 is convex near the optical axis, and the image-side surface S7 of the second lens L2 is convex near the optical axis. The object-side surface S8 of the third lens L3 is concave near the optical axis, and the image-side surface S9 of the third lens L3 is concave near the optical axis. The object-side surface S10 of the fourth lens L4 is concave near the optical axis, and the image-side surface S11 of the fourth lens L4 is convex near the optical axis. The object-side surface S12 of the fifth lens L5 is convex near the optical axis, and the image-side surface S13 of the fifth lens L5 is concave near the optical axis.

When the optical imaging device 10 is used, rays from the object side enter the optical imaging device 10, successively pass through the first lens L1, the stop STO, the second lens L2, the third lens L3, the fourth lens L4, the fifth lens L5, and the infrared filter L6, and finally converge on the image plane IMA.

Table 5 shows characteristics of the optical imaging device 10. A reference wavelength of focal length, refractive index, and Abbe number is 558 nm, and the units of radius of curvature, thickness, and semi-diameter are in millimeters (mm).

TABLE 5

Third embodiment
f = 1.275 mm, FNO = 2.392, FOV = 128.664°

| Surface | Lens | Type of surface | radius of curvature | thickness | material | refractive index | Abbe number | semi-diameter |
|---|---|---|---|---|---|---|---|---|
| object side surface | | standard surface | infinite | 10000000000 | | | | 0.000 |
| S1 | | standard surface | infinite | 0.000 | | | | 1.913 |
| S2 | | standard surface | infinite | 0.000 | | | | 1.913 |
| S3 | first lens | aspheric surface | 0.149 | 0.261 | glass | 1.53 | 55.7 | 1.104 |
| S4 | | aspheric surface | 1.066 | 0.762 | | | | 0.674 |
| S5 | | standard surface | 0.000 | 0.002 | | | | 0.365 |
| S6 | second lens | aspheric surface | 0.441 | 0.678 | glass | 1.54 | 55.6 | 0.399 |
| S7 | | aspheric surface | 1.070 | 0.123 | | | | 0.615 |
| S8 | third lens | aspheric surface | 0.116 | 0.250 | glass | 1.66 | 22.4 | 0.695 |
| S9 | | aspheric surface | 0.760 | 0.092 | | | | 0.901 |
| S10 | fourth lens | aspheric surface | −0.196 | 0.805 | glass | 1.54 | 55.6 | 0.936 |
| S11 | | aspheric surface | −1.280 | 0.067 | | | | 1.030 |

TABLE 5-continued

Third embodiment
f = 1.275 mm, FNO = 2.392, FOV = 128.664°

| Surface | Lens | Type of surface | radius of curvature | thickness | material | refractive index | Abbe number | semi-diameter |
|---|---|---|---|---|---|---|---|---|
| S12 | fifth lens | aspheric surface | 0.687 | 0.314 | glass | 1.65 | 22.4 | 1.198 |
| S13 | | aspheric surface | 1.437 | 0.243 | | | | 1.550 |
| S14 | infrared filter | standard surface | infinite | 0.150 | glass | 1.52 | 51.3 | 1.711 |
| S15 | | standard surface | infinite | 0.597 | | | | 1.767 |
| IMA | | standard surface | infinite | 0.000 | | | | 2.157 | f is the effective focal length of the optical imaging device 10, FNO is the F-number of the optical imaging device 10, and FOV is the maximum field of view of the optical imaging device 10.

TABLE 6

Third embodiment

| surface | K | K4 | K6 | K8 | K10 |
|---|---|---|---|---|---|
| S3 | 0.000E+00 | 8.217E−01 | −1.651E+00 | 2.433E+00 | −2.151E+00 |
| S4 | 0.000E+00 | 8.217E−01 | −1.651E+00 | 2.433E+00 | −2.151E+00 |
| S6 | 0.000E+00 | −1.214E−01 | −5.176E+00 | 6.247E+01 | −3.922E+02 |
| S7 | 0.000E+00 | −1.214E−01 | −5.176E+00 | 6.247E+01 | −3.922E+02 |
| S8 | 0.000E+00 | −8.709E−01 | 1.341E+00 | 4.600E−01 | −8.923E+00 |
| S9 | 0.000E+00 | −8.709E−01 | 1.341E+00 | 4.600E−01 | −8.923E+00 |
| S10 | 0.000E+00 | 8.403E−03 | −5.782E−01 | 4.218E+00 | −1.524E+01 |
| S11 | 0.000E+00 | 2.082E−01 | −6.560E−01 | 3.478E+00 | −8.225E+00 |
| S12 | 0.000E+00 | −8.763E−01 | 3.869E−03 | 2.927E+00 | −6.296E+00 |
| S13 | 0.000E+00 | −1.379E+00 | 1.913E+00 | −1.820E+00 | 1.050E+00 |

| surface | K12 | K14 | K16 | K18 | K20 |
|---|---|---|---|---|---|
| S3 | 9.705E−01 | −1.751E−01 | 0.000E+00 | 0.000E+00 | 0.000E+00 |
| S4 | 9.705E−01 | −1.751E−01 | 0.000E+00 | 0.000E+00 | 0.000E+00 |
| S6 | 1.314E+03 | −2.236E+03 | 1.347E+03 | 3.166E+02 | 0.000E+00 |
| S7 | 1.314E+03 | −2.236E+03 | 1.347E+03 | 3.166E+02 | 0.000E+00 |
| S8 | 2.303E+01 | −3.060E+01 | 2.166E+01 | −6.629E+00 | 0.000E+00 |
| S9 | 2.303E+01 | −3.060E+01 | 2.166E+01 | −6.629E+00 | 0.000E+00 |
| S10 | 3.215E+01 | −3.940E+01 | 2.617E+01 | −7.383E+00 | 0.000E+00 |
| S11 | 1.144E+01 | −1.234E+01 | 1.099E+01 | −5.999E+00 | 1.322E+00 |
| S12 | 6.270E+00 | −3.470E+00 | 1.092E+00 | −1.587E−01 | 0.000E+00 |
| S13 | −3.010E−01 | −1.634E−02 | 4.269E−02 | −1.284E−02 | 1.336E−03 |

Figure 6:
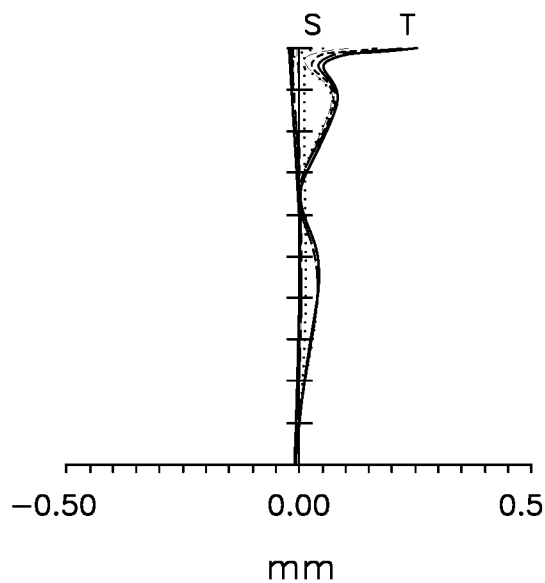
FIG. 6 is a diagram of field curvatures and distortions of the optical imaging device in the third embodiment.
Figure 6:
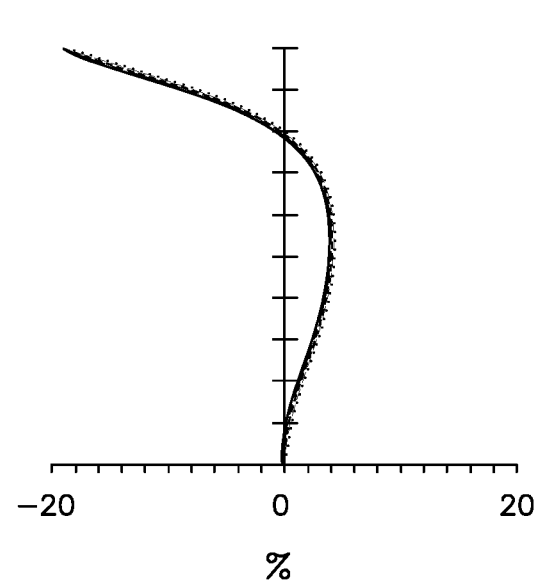

FIG. 6 shows field curvature curves and distortion curves of the optical imaging device 10 of the third embodiment, the reference wavelength of field curvature curves and distortion curves is 455 nm. The field curvature curves represent the meridian field curvature and the sagittal field curvature, in which the maximum value of each of the sagittal field curve and the meridional field curve is less than 0.3 mm, indicating that good compensation is obtained. The distortion curves represent distortion values corresponding to different field angles, in which the maximum distortion is less than 20%, indicating that distortion has been corrected.

Fourth Embodiment

Figure 7:
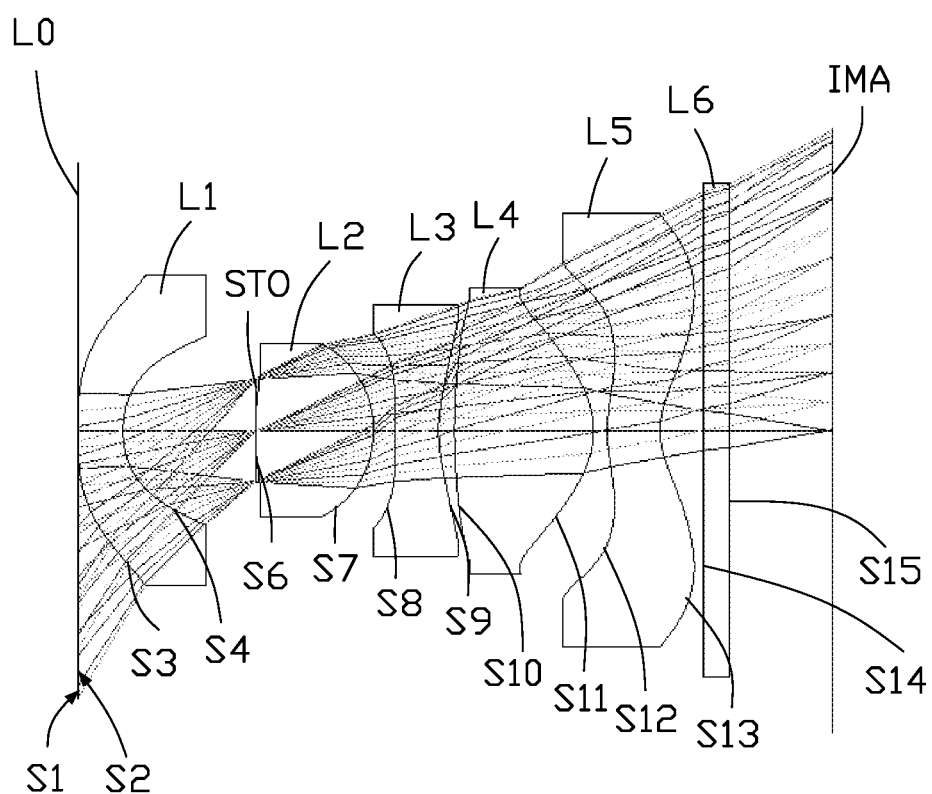
FIG. 7 is a diagrammatic view of a fourth embodiment of an optical imaging device according to the present disclosure.

Referring to FIG. 7, the optical imaging device 10 includes, from the object side to the image side, a first lens L1 with a refractive power, a stop STO, a second lens L2 with a positive refractive power, a third lens L3 with a negative refractive power, a fourth lens L4 with a positive refractive power, a fifth lens L5 with a positive refractive power, and an infrared filter L6.

The object-side surface S3 of the first lens L1 is convex near the optical axis, and the image-side surface S4 of the first lens L1 is concave near the optical axis. The object-side surface S6 of the second lens L2 is convex near the optical axis, and the image-side surface S7 of the second lens L2 is convex near the optical axis. The object-side surface S8 of the third lens L3 is concave near the optical axis, and the image-side surface S9 of the third lens L3 is concave near the optical axis. The object-side surface S10 of the fourth lens L4 is concave near the optical axis, and the image-side surface S11 of the fourth lens L4 is convex near the optical axis. The object-side surface S12 of the fifth lens L5 is convex near the optical axis, and the image-side surface S13 of the fifth lens L5 is concave near the optical axis.

When the optical imaging device 10 is used, rays from the object side enter the optical imaging device 10, successively pass through the first lens L1, the stop STO, the second lens L2, the third lens L3, the fourth lens L4, the fifth lens L5, and the infrared filter L6, and finally converge on the image plane IMA.

Table 7 shows characteristics of the optical imaging device 10. A reference wavelength of focal length, refractive index, and Abbe number is 558 nm, and the units of radius of curvature, thickness, and semi-diameter are in millimeters (mm).

TABLE 7

Fourth embodiment
f = 1.275 mm, FNO = 2.392, FOV = 128.664°

| Surface | Lens | Type of surface | radius of curvature | thickness | material | refractive index | Abbe number | semi-diameter |
|---|---|---|---|---|---|---|---|---|
| object side surface | | standard surface | infinite | 10000000000 | | | | 0.000 |
| S1 | | standard surface | infinite | 0.000 | | | | 1.913 |
| S2 | | standard surface | infinite | 0.000 | | | | 1.913 |
| S3 | first lens | aspheric surface | 0.149 | 0.261 | glass | 1.54 | 55.7 | 1.104 |
| S4 | | aspheric surface | 1.066 | 0.762 | | | | 0.674 |
| S5 | | standard surface | 0.000 | 0.002 | | | | 0.365 |
| S6 | second lens | aspheric surface | 0.441 | 0.678 | glass | 1.53 | 55.6 | 0.399 |
| S7 | | aspheric surface | 1.070 | 0.123 | | | | 0.615 |
| S8 | third lens | aspheric surface | 0.112 | 0.250 | glass | 1.64 | 22.4 | 0.694 |
| S9 | | aspheric surface | 0.756 | 0.092 | | | | 0.900 |
| S10 | fourth lens | aspheric surface | −0.187 | 0.798 | glass | 1.53 | 55.6 | 0.932 |
| S11 | | aspheric surface | −1.294 | 0.080 | | | | 1.019 |
| S12 | fifth lens | aspheric surface | 0.689 | 0.303 | glass | 1.64 | 22.4 | 1.200 |
| S13 | | aspheric surface | 1.443 | 0.245 | | | | 1.544 |
| S14 | infrared filter | standard surface | infinite | 0.150 | glass | 1.56 | 51.3 | 1.705 |
| S15 | | standard surface | infinite | 0.597 | | | | 1.760 |
| IMA | | standard surface | infinite | 0.000 | | | | 2.156 | f is the effective focal length of the optical imaging device 10, FNO is the F-number of the optical imaging device 10, and FOV is the maximum field of view of the optical imaging device 10.

TABLE 8

Fourth embodiment

| surface | K | K4 | K6 | K8 | K10 |
|---|---|---|---|---|---|
| S3 | 0.000E+00 | 8.217E−01 | −1.651E+00 | 2.433E+00 | −2.151E+00 |
| S4 | 0.000E+00 | 8.217E−01 | −1.651E+00 | 2.433E+00 | −2.151E+00 |
| S6 | 0.000E+00 | −1.214E−01 | −5.176E+00 | 6.247E+01 | −3.922E+02 |
| S7 | 0.000E+00 | −1.214E−01 | −5.176E+00 | 6.247E+01 | −3.922E+02 |
| S8 | 0.000E+00 | −8.640E−01 | 1.308E+00 | 5.124E−01 | −8.873E+00 |
| S9 | 0.000E+00 | −8.640E−01 | 1.308E+00 | 5.124E−01 | −8.873E+00 |
| S10 | 0.000E+00 | −3.235E−03 | −5.682E−01 | 4.193E+00 | −1.524E+01 |
| S11 | 0.000E+00 | 2.385E−01 | −7.706E−01 | 3.608E+00 | −8.229E+00 |
| S12 | 0.000E+00 | −8.664E−01 | −5.249E−02 | 3.001E+00 | −6.312E+00 |
| S13 | 0.000E+00 | −1.390E+00 | 1.922E+00 | −1.824E+00 | 1.051E+00 |

| surface | K12 | K14 | K16 | K18 | K20 |
|---|---|---|---|---|---|
| S3 | 9.705E−01 | −1.751E−01 | 0.000E+00 | 0.000E+00 | 0.000E+00 |
| S4 | 9.705E−01 | −1.751E−01 | 0.000E+00 | 0.000E+00 | 0.000E+00 |
| S6 | 1.314E+03 | −2.236E+03 | 1.347E+03 | 3.166E+02 | 0.000E+00 |
| S7 | 1.314E+03 | −2.236E+03 | 1.347E+03 | 3.166E+02 | 0.000E+00 |
| S8 | 2.289E+01 | −3.070E+01 | 2.203E+01 | −6.852E+00 | 0.000E+00 |
| S9 | 2.289E+01 | −3.070E+01 | 2.203E+01 | −6.852E+00 | 0.000E+00 |
| S10 | 3.230E+01 | −3.953E+01 | 2.606E+01 | −7.272E+00 | 0.000E+00 |
| S11 | 1.139E+01 | −1.240E+01 | 1.104E+01 | −5.916E+00 | 1.265E+00 |
| S12 | 6.254E+00 | −3.469E+00 | 1.095E+00 | −1.585E−01 | 0.000E+00 |
| S13 | −3.008E−01 | −1.634E−02 | 4.261E−02 | −1.281E−02 | 1.335E−03 |

Figure 8:
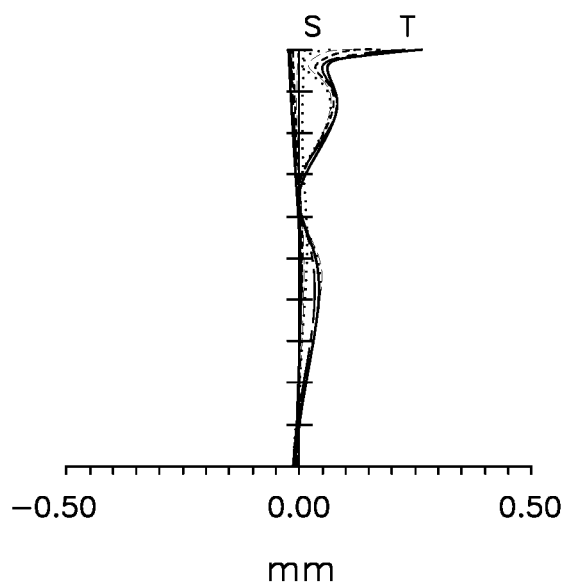
FIG. 8 is a diagram of field curvatures and distortions of the optical imaging device in the fourth embodiment.
Figure 8:
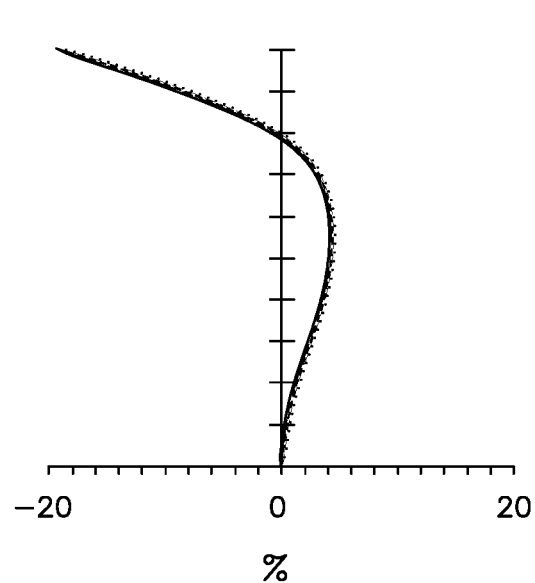

FIG. 8 shows field curvature curves and distortion curves of the optical imaging device 10 of the fourth embodiment, the reference wavelength of field curvature curves and distortion curves is 455 nm. The field curvature curves represent the meridian field curvature and the sagittal field curvature, in which the maximum value of each of the sagittal field curve and the meridional field curve is less than 0.3 mm, indicating that good compensation is obtained. The distortion curves represent distortion values corresponding to different field angles, in which the maximum distortion is less than 20%, indicating that distortion has been corrected.

Table 9 shows values of FOV/TL5, FNO/TL4, Imgh/f, (V2+V3+V5)/(V1+V4), TL1/f, f/EPD, and V4/V5 of the optical imaging device 10 in the first to fourth embodiments.

TABLE 9

|  | FOV/TL5 | FNO/TL4 | Imgh/f | (V2 + V3 + V5)/(V1 + V4) | TL1/f | f/EPD | V4/V5 |
|---|---|---|---|---|---|---|---|
| First embodiment | 98.38 | 1.143 | 1.684 | 0.866 | 3.402 | 2.4 | 2.732 |
| Second embodiment | 101.582 | 1.140 | 1.703 | 0.764 | 3.231 | 2.4 | 2.575 |
| Third embodiment | 98.669 | 1.100 | 1.830 | 0.902 | 3.405 | 2.366 | 2.483 |
| Fourth embodiment | 99.367 | 1.100 | 1.686 | 0.902 | 3.426 | 2.366 | 2.483 |

Figure 9:
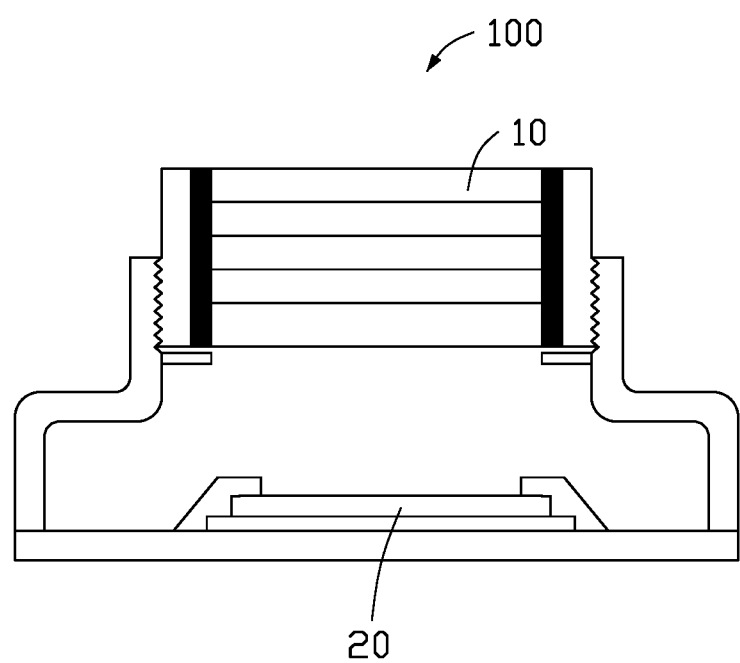
FIG. 9 is a diagrammatic view of an embodiment of an imaging module according to the present disclosure.

Referring to FIG. 9, an embodiment of an imaging module 100 is further provided, which includes the optical imaging device 10 and an optical sensor 20. The optical sensor 20 is arranged on the image side of the optical imaging device 10.

The optical sensor 20 can be a CMOS (complementary metal oxide semiconductor) sensor or a charge coupled device (CCD).

Figure 10:
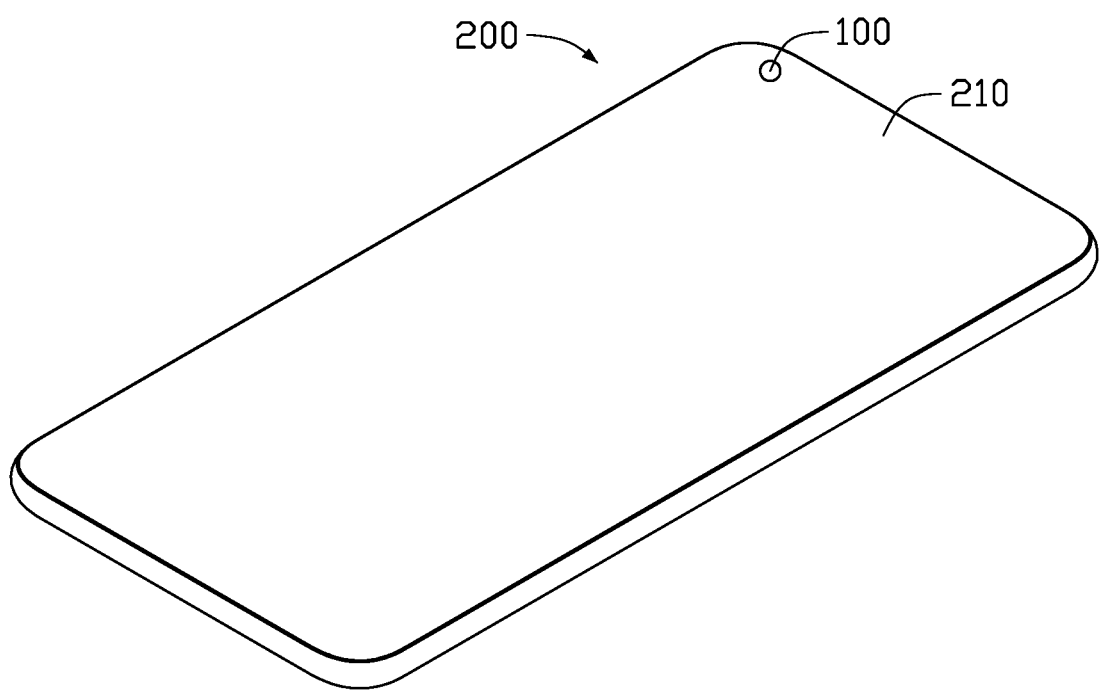
FIG. 10 is a diagrammatic view of an embodiment of an electronic device using an optical imaging device in one embodiment according to the present disclosure.

Referring to FIG. 10, an embodiment of an electronic device 1000 includes the imaging module 100 and a housing 200. The imaging module 100 is mounted on the housing 200.

The electronic device 1000 can be a smart phone, a tablet computer, a notebook computer, an e-book reader, a portable multimedia player (PMP), a portable telephone, a video telephone, a digital camera, a mobile medical device, a wearable device, etc.

Even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present exemplary embodiments, to the full extent indicated by the plain meaning of the terms in which the appended claims are expressed.

What is claimed is:

1. An optical imaging device, from an object side to an image side, comprising:
   a first lens, wherein an image-side surface of the first lens is concave near an optical axis of the optical imaging device;
   a second lens having a positive refractive power;
   a third lens having a negative refractive power, wherein an image-side surface of the third lens is concave near the optical axis;
   a fourth lens having a positive refractive power; and
   a fifth lens having a positive refractive power,
   wherein the optical imaging device satisfies the following formulas:

$$95°/mm < FOV/TL5 < 105°/mm \text{ and } 1 \text{ mm}^{-1} < FNO/TL4 < 1.5 \text{ mm}^{-1};$$

wherein, FOV is a maximum field of view of the optical imaging device, TL5 is a distance from an object-side surface of the fifth lens to an image plane of the optical imaging device along the optical axis, FNO is a F-number of the optical imaging device, and TL4 is a distance from an object-side surface of the fourth lens to the image plane along the optical axis, the object-side surface of the fourth lens is concave near the optical axis, and an image-side surface of the fourth lens is convex near the optical axis.

2. The optical imaging device of claim 1, wherein an image-side surface of the fifth lens is concave near the optical axis and is convex near an edge of the fifth lens, at least one of the image-side surface of the fifth lens and the object-side surface of the fifth lens is aspherical.

3. The optical imaging device of claim 1, further satisfying the following formula:

$$1.5 < Imgh/f < 2.0;$$

wherein, Imgh is a half of an image height corresponding to FOV, and f is an effective focal length of the optical imaging device.

4. The optical imaging device of claim 1, further satisfying the following formula:

$$0.75 < (V2 + V3 + V5)/(V1 + V4) < 1;$$

wherein V1 is a dispersion coefficient of the first lens, V2 is a dispersion coefficient of the second lens, V3 is a dispersion coefficient of the third lens, V4 is a dispersion coefficient of the fourth lens, and V5 is a dispersion coefficient of the fifth lens.

5. The optical imaging device of claim 1, further satisfying the following formula:

$$3 < TL1/f < 3.5;$$

wherein, TL1 is a distance from an object-side surface of the first lens to the image plane along the optical axis, and f is an effective focal length of the optical imaging device.

6. The optical imaging device of claim 1, further satisfying the following formula:

$$f/EPD < 2.5;$$

wherein, f is an effective focal length of the optical imaging device, and EPD is an entrance pupil diameter of the optical imaging device.

7. The optical imaging device of claim 1, further satisfying the following formula:

$$2.4 < V4/V5 < 3.0;$$

wherein V4 is a dispersion coefficient of the fourth lens, and V5 is a dispersion coefficient of the fifth lens.

8. An imaging module, comprising:
an optical imaging device, from an object side to an image side, comprising:
   a first lens, wherein an image-side surface of the first lens is concave near an optical axis of the optical imaging device;
   a second lens having a positive refractive power;
   a third lens having a negative refractive power, wherein an image-side surface of the third lens is concave near the optical axis;
   a fourth lens having a positive refractive power; and
   a fifth lens having a positive refractive power; and
an optical sensor arranged on the image side of the optical imaging device;
wherein the optical imaging device satisfies the following formulas:

$$95°/mm < FOV/TL5 < 105°/mm \text{ and } 1 \text{ mm}^{-1} < FNO/TL4 < 1.5 \text{ mm}^{-1};$$

wherein, FOV is a maximum field of view of the optical imaging device, TL5 is a distance from an object-side surface of the fifth lens to an image plane of the optical imaging device along the optical axis, FNO is a F-number of the optical imaging device, and TL4 is a distance from an object-side surface of the fourth lens to the image plane along the optical axis, the object-side surface of the fourth lens is concave near the optical axis, and an image-side surface of the fourth lens is convex near the optical axis.

9. The imaging module of claim 8, wherein an image-side surface of the fifth lens is concave near the optical axis and is convex near an edge of the fifth lens, at least one of the image-side surface of the fifth lens and the object-side surface of the fifth lens is aspherical.

10. The imaging module of claim 8, wherein the optical imaging device further satisfies the following formula:

$$1.5 < Imgh/f < 2.0;$$

wherein, Imgh is a half of an image height corresponding to FOV, and f is an effective focal length of the optical imaging device.

11. The imaging module of claim 8, wherein the optical imaging device further satisfies the following formula:

$$0.75 < (V2 + V3 + V5)/(V1 + V4) < 1;$$

wherein V1 is a dispersion coefficient of the first lens, V2 is a dispersion coefficient of the second lens, V3 is a dispersion coefficient of the third lens, V4 is a dispersion coefficient of the fourth lens, and V5 is a dispersion coefficient of the fifth lens.

12. The imaging module of claim 8, wherein the optical imaging device further satisfies the following formula:

$$3 < TL1/f < 3.5;$$

wherein, TL1 is a distance from an object-side surface of the first lens to the image plane along the optical axis, and f is an effective focal length of the optical imaging device.

13. The imaging module of claim 8, wherein the optical imaging device further satisfies the following formula:

$$f/EPD < 2.5;$$

wherein, f is an effective focal length of the optical imaging device, and EPD is an entrance pupil diameter of the optical imaging device.

14. The imaging module of claim 8, wherein the optical imaging device further satisfies the following formula:

$$2.4 < V4/V5 < 3.0;$$

wherein V4 is a dispersion coefficient of the fourth lens, and V5 is a dispersion coefficient of the fifth lens.

15. An electronic device, comprising:
a housing; and
an imaging module mounted on the housing, the imaging module comprising:
   an optical imaging device, from an object side to an image side, comprising:
      a first lens, wherein an image-side surface of the first lens is concave near an optical axis of the optical imaging device;
      a second lens having a positive refractive power;
      a third lens having a negative refractive power, wherein an image-side surface of the third lens is concave near the optical axis;
      a fourth lens having a positive refractive power; and
      a fifth lens having a positive refractive power; and
   an optical sensor arranged on the image side of the optical imaging device;
wherein the optical imaging device satisfies the following formulas:

$$95°/mm < FOV/TL5 < 105°/mm \text{ and } 1 \text{ mm}^{-1} < FNO/TL4 < 1.5 \text{ mm}^{-1};$$

wherein, FOV is a maximum field of view of the optical imaging device, TL5 is a distance from an object-side surface of the fifth lens to an image plane of the optical imaging device along the optical axis, FNO is a F-number of the optical imaging device, and TL4 is a distance from an object-side surface of the fourth lens to the image plane along the optical axis, the object-side surface of the fourth lens is concave near the optical axis, and an image-side surface of the fourth lens is convex near the optical axis.

16. The electronic device of claim 15, wherein an image-side surface of the fifth lens is concave near the optical axis and is convex near an edge of the fifth lens, at least one of the image-side surface of the fifth lens and the object-side surface of the fifth lens is aspherical.

17. The electronic device of claim 15, wherein the optical imaging device further satisfies the following formula:

$$1.5 < Imgh/f < 2.0;$$

wherein, Imgh is a half of an image height corresponding to FOV, and f is an effective focal length of the optical imaging device.

* * * * *